United States Patent [19]

Henry

[11] Patent Number: 4,841,302

[45] Date of Patent: Jun. 20, 1989

[54] TRANSMITTER DETECTOR FOR USE IN A MOVING VEHICLE

[75] Inventor: Philip Henry, Las Vegas, Nev.

[73] Assignee: Gray Electronics, Inc., Green Valley, Nev.

[21] Appl. No.: 9,947

[22] Filed: Jan. 30, 1987

[51] Int. Cl.$^{4}$ .................... H04B 17/00

[52] U.S. Cl. .................... 342/20; 340/825.36; 340/901; 340/905; 455/49; 455/161; 455/345

[58] Field of Search .................... 342/13, 20; 455/49, 455/150, 160, 161, 168, 188, 196, 197, 199, 227, 228, 229, 230, 345; 340/567, 825.36, 901, 902, 904, 905, 903

[56] References Cited

U.S. PATENT DOCUMENTS

| | | | |
|---|---|---|---|
| 2,968,802 | 1/1961 | Flory et al. | 340/516 |
| 3,185,992 | 5/1965 | Smith | 740/905 |
| 3,233,217 | 2/1966 | Bost, Jr. | 340/901 |
| 3,293,600 | 12/1966 | Gifft | 340/903 |
| 3,532,986 | 10/1970 | Gelushia et al. | 455/78 |
| 3,673,560 | 6/1972 | Barsh et al. | 340/901 |
| 3,760,349 | 9/1973 | Keister et al. | 340/902 |
| 3,772,641 | 11/1973 | Grosser et al. | 340/901 |
| 3,775,743 | 11/1973 | Carter | 340/905 |
| 4,146,892 | 3/1979 | Overman et al. | 342/20 |
| 4,190,838 | 2/1980 | Kemp | 342/20 |
| 4,196,412 | 4/1980 | Shula et al. | 340/901 |
| 4,238,778 | 12/1980 | Ohsumi | 340/903 |
| 4,313,216 | 1/1982 | Jaeger et al. | 342/20 X |
| 4,403,208 | 9/1983 | Hodgson et al. | 340/902 |
| 4,581,769 | 4/1986 | Grimsley et al. | 342/20 X |
| 4,626,857 | 12/1986 | Imazeki | 342/20 |
| 4,630,054 | 12/1986 | Martinson | 342/20 |
| 4,700,191 | 10/1987 | Manor | 342/20 X |
| 4,733,100 | 3/1988 | Nusairat et al. | 455/345 X |

OTHER PUBLICATIONS

"PAC.RT Portable/Mobile Vehicular Repeater System", Motorola brochure, date unknown.

*Primary Examiner*—Theodore M. Blum
*Assistant Examiner*—Bernarr Earl Gregory
*Attorney, Agent, or Firm*—Wolf, Greenfield & Sacks

[57] ABSTRACT

Detection apparatus for alerting an operator of a moving vehicle to the proximity of a radio transmitter of known frequency and power, typically in a police vehicle. The detection apparatus includes a scanner radio having a selected channel set to the know frequency so that it provides a channel active signal during the time that the police vehicle transmitter is on. The detection apparatus further includes a timing circuit for generating a delay interval representative of the maximum time for the moving vehicle to pass the police vehicle and circuitry for generating a visual and/or audible operator alarm during the channel active signal and during the delay interval. The scanner radio is also utilized to monitor voice transmissions between the dispatcher and the police vehicle, thereby providing the vehicle operator with additional information regarding nearby police vehicles. In an alternative embodiment, a single frequency radio receiver is utilized to provide a visual and/or audible operator alarm and can also be utilized to monitor voice transmissions on the known polic vehicle frequency.

22 Claims, 2 Drawing Sheets

TRANSMITTER DETECTOR FOR USE IN A MOVING VEHICLE

FIELD OF THE INVENTION

This invention relates to detection apparatus for use in a moving vehicle and, more particularly, to detection apparatus for alerting an operator of a moving vehicle to the proximity of a radio transmitter of known frequency and power, typically in a police vehicle.

BACKGROUND OF THE INVENTION

Devices for detecting the proximity of a police vehicle to a moving vehicle are well-known. Such devices are normally utilized by the vehicle operator to maintain his speed within the posted speed limit when a police vehicle is in the vicinity. Usually, police vehicles are detected by detecting transmissions of the police radar system.

Another approach is to detect voice radio transmissions by the police vehicle. Generally, this technique is not practical since the power of such radio transmissions is so great that they are picked up by a detector over a very wide area. Recently, however, many police agencies are utilizing a system known as a mobile extender to provide the capability for police officers to communicate with the dispatcher and with other police vehicles by means of a handheld radio or walkie-talkie when they are outside the police vehicle. In the mobile extender system, the police vehicle is equipped with a low power transceiver for communicating with the handheld radio at one frequency. Transmissions between the vehicle and the dispatcher are carried on a high power transmitter at a different frequency. The mobile extender transceiver has a range of approximately 3–4 miles and transmits when the police dispatcher is communicating with that police vehicle or any other police vehicle within the district. Accordingly, transmissions by the mobile extender transceiver are frequent.

It is a general object of the present invention to provide apparatus for detecting transmissions of a radio transmitter of known frequency and power within a predetermined distance from a moving vehicle.

It is another object of the present invention to provide apparatus for detecting the proximity of a police vehicle to a moving vehicle by detecting voice radio transmissions by the police vehicle.

It is another object of the present invention to provide apparatus for detecting the proximity of a police vehicle to a moving vehicle wherein an operator alarm remains active until the moving vehicle has passed the police vehicle.

It is another object of the present invention to provide police vehicle detection apparatus which is reliable and low in cost.

SUMMARY OF THE INVENTION

According to the present invention, these and other objects and advantages are achieved in apparatus for detecting the proximity of a radio transmitter of known frequency and power to a moving vehicle. Typically, the transmitter is a mobile extender transmitter in a police vehicle. The detection apparatus comprises a radio frequency scanner having a selected channel set to the known frequency so that it provides a channel active signal during the time that a signal is received on the known frequency. The detection apparatus further includes timing means responsive to the channel active signal for generating a timing delay having a duration representative of the maximum time for the moving vehicle to pass the transmitter based on an estimated speed of the vehicle and the maximum distance to the transmitter, and alert means for generating an operator alert during the channel active signal and during the timing delay.

The timing delay is initiated by the end of the channel active signal and has a duration based on the known range of the transmitter and the speed of the vehicle. The alert means typically comprises an alarm indicator light illuminated during the channel active signal and during the timing delay, and also an audible alarm initiated at the beginning of the channel active signal. The audible alarm can comprise audible tone pulses continuing for the duration of the channel active signal or can comprise a predetermined number of audible tone pulses. The apparatus also includes an all-clear indicator light which is normally illuminated and which is extinguished during the channel active signal and during the timing delay.

According to another feature of the invention, the scanner permits the operator of the vehicle to monitor voice transmissions between the dispatcher and police vehicles and between police vehicles and airborne units. These voice transmissions can be received at a greater range than mobile extender transmissions. In combination, the operator alert system and the monitoring of voice transmissions are highly effective in locating police vehicles.

In another embodiment of the invention, a nonscanning radio receiver capable of receiving the known frequency receives the signal from the transmitter, and a signal detector means provides a channel active signal during the time that the received signal exceeds a prescribed level. The channel active signal activates a visual alarm and/or an audible alarm. In addition, the nonscanning receiver permits monitoring of voice transmissions by the mobile extender transmitter in the police vehicle.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
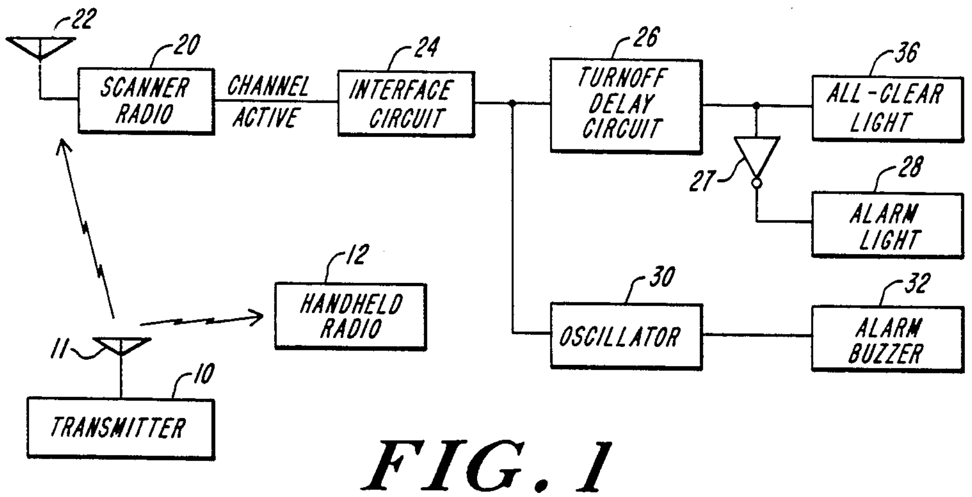
FIG. 1 is a schematic block diagram illustrating detection apparatus in accordance with the present invention.

A schematic block diagram of the detection apparatus in accordance with the present invention is shown in FIG. 1. A transmitter 10, typically located in a police vehicle, transmits through an antenna 11 to a handheld radio 12. A typical mobile extender transmitter 10 operates in the 155 MHz or 465 MHz frequency range and has a sufficient power level to cover a range of 3–4 miles. However, the transmitter can have any predetermined frequency and power level. The transmitter 10 and the handheld radio 12 are components of the existing mobile extender system utilized by the police agency. The police vehicle is also equipped with a higher power transmitter (not shown) on a different frequency from transmitter 10 for communicating with the police dispatcher.

The present invention takes advantage of the limited range of the mobile extender transmitter used by the police vehicle to reduce false alarms by the detection apparatus. For example, if the transmitter in the police vehicle had a range of 20 miles, false alarms would occur almost continuously. However, when the range of the police vehicle transmitter is approximately equal to detection range of interest, a practical system can be provided. Furthermore, the present invention employs a timing circuit in a novel manner to insure that the operator alert continues as long as a police vehicle is within the detection range, even though the police vehicle transmitter is no longer transmitting.

In accordance with the present invention, detection apparatus for detecting transmissions from the transmitter 10 is located in a vehicle. The system includes a scanner radio 20 of conventional design which receives signals over a prescribed frequency range through an antenna 22. The scanner radio 20 is preset, typically on channel 1, to monitor transmissions on the known frequency of the transmitter 10. In a preferred embodiment, the scanner radio 20 is a Fox BMP10/60 scanner which illuminates an indicator light when a signal is received on a selected channel. The scanner 20 is utilized in the priority or action mode wherein the scanner automatically switches to a predetermined channel, usually channel 1, when a signal is received on that channel. This avoids missing police transmissions of interest when the scanner 20 is on another channel. A channel active signal which can be the same signal that activates the indicator light, is supplied from the scanner radio 20 to the detection apparatus of the present invention. An interface circuit 24 converts the channel active signal to a desired voltage and current level and filters out spurious noise spikes. The output of the interface circuit is supplied through a turnoff delay circuit 26 and an inverter 27 to an alarm light 28, and is supplied through an oscillator 30 to an alarm buzzer 32. The output of the turnoff delay circuit 26 is also supplied to an all-clear light 36.

The scanner radio 20 is also utilized to monitor voice transmissions between the dispatcher and the police vehicle and between the police vehicle and airborne units, thereby providing the vehicle operator with additional information regarding nearby police vehicles. The conventional voice radio in a police vehicle usually has a much greater range than the mobile extender transmitter.

Figure 2:
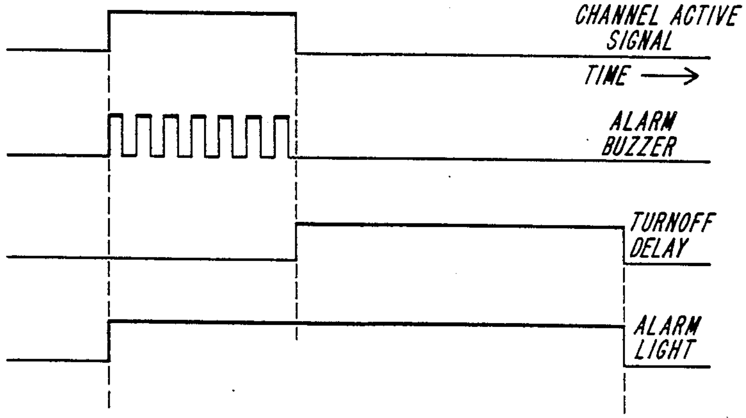
FIG. 2 is a graphic representation of the operation of the system of FIG. 1.

Operation of the detector system shown in FIG. 1 will now be described with reference to FIG. 2 which illustrates various system operations as a function of time. The channel active signal remains in an active state as long as the transmitter 10 is within range of the detection apparatus and is transmitting. The channel active signal initiates both the alarm light 28 and the alarm buzzer 32 in order to alert the operator of the vehicle to the proximity of a police vehicle. The oscillator 30 produces a series of pulses which activate the buzzer 32 as long as the channel active signal is present. When the channel active signal ends, the turnoff delay circuit 26 is activated and causes a delay of predetermined duration in the turnoff of the alarm light 28. The all-clear light 36 is normally illuminated and is extinguished during the channel active signal and during the turnoff delay interval.

The purpose of the turnoff delay is to maintain the alarm light on for a sufficient time after the police vehicle transmission has ended to insure that the moving vehicle has passed the police vehicle. This is done by selecting a delay interval based on the known range of the transmitter 10 and the estimated speed of the vehicle. For example, when the transmitter 10 has a range of 4 miles and the vehicle is moving at 60 mph (one mile per minute), then a 5-minute delay interval insures that the operator's vehicle is past the police vehicle before the operator alarm light goes off. The delay interval is calculated on the basis of worst case conditions when the police vehicle is directly ahead and the transmission is detected at the maximum range of the transmitter. In general, the delay interval must be equal to or greater than the range of the transmitter 10 divided by the speed of the moving vehicle.

It will be understood that the above-described configuration and operation of the alarm light 28 and the alarm buzzer 32 are but one example of many possible alarm configurations. For example, the buzzer can sound continuously rather than being pulsed or can be pulsed a predetermined number of times after a channel active signal indicates a transmission. The alarm tone pulses can be varied in frequency to better attract the operator's attention. In another configuration, the audible alarm signal can be supplied through the speaker of the scanner radio 20. In a further refinement, the number of audible tone pulses can indicate the time since the last transmission by transmitter 10. For example, when the transmitter 10 is going on and off at frequent intervals, the audible alarm sounds only once for each transmission, while more infrequent transmissions are indicated by two, three or more audible tone pulses. This feature is useful to reduce potentially annoying tone pulses in crowded areas. Finally, the audible alert signal can continue during both the channel active signal and the delay interval, if desired.

The delay interval and alarm light are also subject to numerous variations and modifications within the scope of the present invention. For example, the delay interval can be variable depending on received signal strength from transmitter 10. In this case, it is necessary to obtain a transmitter power level signal from the scanner radio 20. The delay interval is reduced as the signal strength increases since the moving vehicle is closer to the transmitter 10 and takes less time to pass it when a strong signal is received. In another embodiment, the delay interval is manually variable by the operator to suit his needs and to compensate for higher or lower average speed of the moving vehicle. In a further refinement, the timing interval can be automatically variable depending on the vehicle's speed. In this case, a signal representative of vehicle speed must be supplied from the vehicle circuitry. Finally, the alarm light can be made to flash in any desired pattern. Regardless of how the delay interval is determined, the alarm condition continues not only during the police vehicle transmission, but also during the delay interval.

Figure 3:
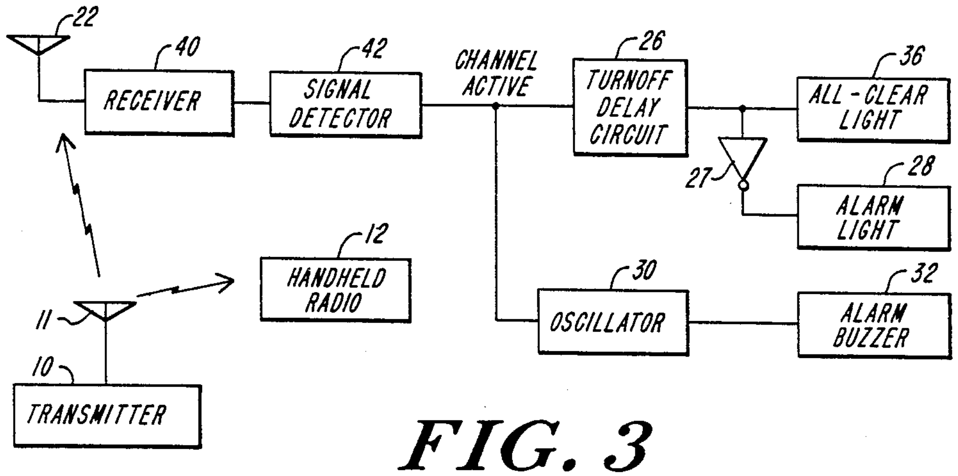
FIG. 3 is a schematic block diagram of an alternate embodiment of the present invention.

Another embodiment of the present invention is illustrated in block diagram form in FIG. 3. The embodiment of FIG. 3 is the same as that of FIG. 1 except that scanner radio 20 and interface circuit 24 are replaced by a radio receiver 40 which receives transmissions through antenna 22 and a signal detector 42 connected to the output of receiver 40. The receiver 40 is a non-scanning receiver tuned to the operating frequency of the transmitter 10 and having an output representative of received signal strength. The receiver 40 can be a single frequency receiver at the frequency of the mobile extender transmitter 10 or any other suitable radio receiver capable of receiving the frequency of the mobile extender transmitter 10 and set to that frequency. The signal detector 42 provides a channel active signal at its output when the output from receiver 40 exceeds a predetermined level. The remainder of the system operates as shown in FIG. 1 and described hereinabove. The embodiment of FIG. 3 provides operator alarm signals such as alarm light 28 and/or an audible signal from alarm buzzer 32. In addition, the receiver 40 can be utilized to monitor voice transmissions by the mobile extender transmitter 10, thereby providing additional information regarding nearby police vehicles.

Figure 4:
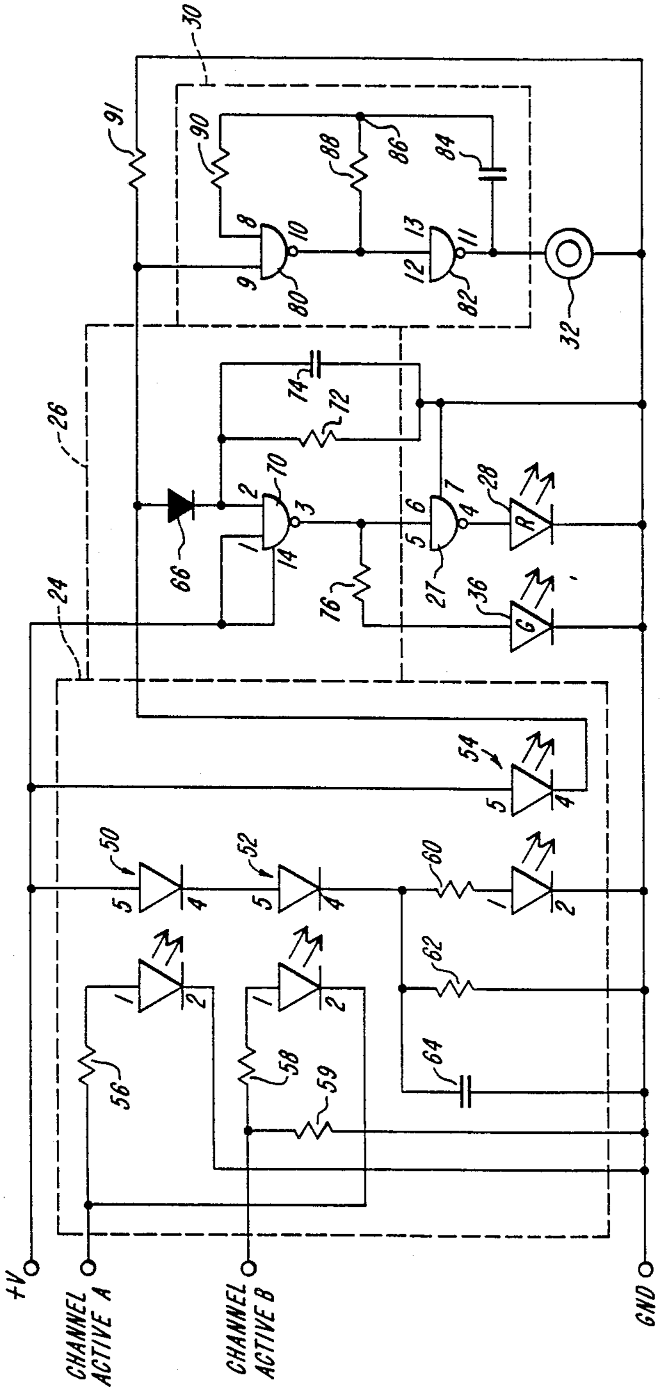
FIG. 4 is a detailed schematic diagram of a portion of the circuitry utilized in FIG. 1.

A detailed circuit diagram of interface circuit 24, turnoff delay circuit 26, oscillator 30 and associated circuitry is shown in FIG. 4. A voltage source +V (typically 12 volts) is obtained from the scanner radio 20 power supply. In the present example, the scanner is a Fox BMP10/60 scanner. The channel active A and channel active B signals are obtained by connections across the channel 1 LED indicator in the scanner. It will be understood that the channel active signal can be obtained at other suitable points in the scanner, if desired. The channel active A and channel active B signals are supplied to the interface ciruict 24 which includes three optical isolator devices 50, 52 and 54. The channel active A signal is coupled through a resistor 56 to the input diode of optical isolator 50. The channel active B signal is coupled through a resistor 58 to the input diode of optical isolator 52. The input diodes of optical isolators 50 and 52 are coupled in series. Similarly, the output devices of optical isolators 50 and 52 are coupled in series. When the channel active A and channel active B signals are present, optical isolators 50 and 52 are turned on and a current is supplied through a series resistor 60 to the input diode of optical isolator 54. This current turns on the output device of optical isolator 54 and supplies a voltage to delay circuit 26 and to oscillator 30. A resistor 62 and a capacitor 64 are coupled in parallel between the output of isolator 52 and ground to filter out spurious signals and transients appearing on the channel active signal.

The output of optical isolator 54 is supplied through a diode 66 to an input of a logic gate 70 which is connected to operate as an inverter. A timing resistor 72 and a timing capacitor 74 are connected in parallel between the input of inverter 70 and ground. The output of inverter 70 is supplied through a resistor 76 to the all-clear light 36 which can be a green LED. The output of inverter 70 is also supplied to the input of the inverter 27. The output of inverter 27 is supplied to the alarm light 28 which can be a red LED.

The output of the optical isolator 54 is also supplied to one input of a logic gate 80. The output of the logic gate 80 is supplied to the input of an inverter 82 which in turn has its output connected to the alarm buzzer 32. The buzzer 32 can be a piezoelectric device. A capacitor 84 is connected between the output of inverter 82 and a connection point 86. The connection point 86 is connected through a resistor 88 to the input of inverter 82 and is connected through a resistor 90 to a second input of logic gate 80. The gate 80, inverter 82, capacitor 84 and resistors 88, 90 form an oscillator which energizes buzzer 32 approximately twice per second when a channel active signal is present.

The following list gives suitable values for the components shown in the circuit of FIG. 4. It will be understood that those values are given by way of example only.

| Component Type | Reference No. | Value or Part No. |
|---|---|---|
| Resistor | 56 | 2.2K ohms |
| Resistor | 58 | 470 ohms |
| Resistor | 59 | 220 ohms |
| Resistor | 60,76 | 1.0K ohms |
| Resistor | 62,88,90,91 | 100K ohms |
| Resistor | 72 | 2.2M ohms |
| Capacitor | 64,84 | 4.7 microfarads |
| Capacitor | 74 | 220 microfarads |
| Diode | 66 | IN4148 |
| Optical isolator | 50,52,54 | H11B1 |
| Logic element | 70,27,80,82 | 4011BE |
| Buzzer | 32 | MCP320B2 |

When a channel active signal is present, the output of isolator 54 goes to a higher voltage and supplies a current through diode 66 which charges capacitor 74. Capacitor 74 remains charged as long as the channel active signal is present. When the channel active signal ends, diode 66 is reverse biased and capacitor 74 begins to discharge through resistor 72. The input to inverter 70 is very high impedance since an MOS-type device is utilized. The time constant of the capacitor 74 discharge is thus determined primarily by resistor 72. The alarm light 28 is maintained on for a time period determined by the time constant of timing resistor 72 and timing capacitor 74, even though the channel active signal has ended. As a result, the delay interval described hereinabove is determined by the timing components resistor 72 and capacitor 74.

In an optional feature of the invention, the squelch signal from the scanner radio 20 can be connected to the detection circuit of FIG. 4. The detection circuit is not activated unless both the channel active and squelch signals are present. This permits the scanner radio 20 to be set, or parked, on channel 1 without receiving a false alarm due to the channel 1 indicator light being on.

In operation, the circuit shown in FIG. 4 pulses alarm buzzer 32 twice per second during the channel active signal and maintains alarm light 28 on during the channel active signal and during the delay interval after the end of the channel active signal. In the present example, the delay interval is approximately five minutes. Due to differences in threshold levels, the all-clear light 36 comes on several seconds before the alarm light 28 goes off. The condition wherein both lights 28, 36 are on can be recognized as an all clear indication if no police vehicles can be seen for approximately one-half mile ahead.

While there has been shown and described what is at present considered the preferred embodiments of the present invention, it will be obvious to those skilled in the art that various changes and modifications may be made therein without departing from the scope of the invention as defined by the appended claims.

I claim:

1. Apparatus for detecting the proximity of a radio transmitter of known frequency and power to a moving vehicle, comprising:

a radio frequency scanner having a selected channel set to said known frequency so that it provides a channel active signal during the time that a signal is received on said known frequency;

timing means responsive to said channel active signal for generating a timing delay signal having a duration representative of the maximum time for said moving vehicle to pass said transmitter based on an estimated speed of said vehicle and the range of said transmitter; and alert means responsive to said channel active signal and said timing delay signal for generating an operator alert during said channel active signal and during said timing delay signal.

2. Detection apparatus as defined in claim 1 wherein said timing delay signal is initiated by the end of said channel active signal.

3. Detection apparatus as defined in claim 2 wherein said alert means comprises an alarm indicator light illuminated during said channel active signal and during said timing delay signal.

4. Detection apparatus as defined in claim 3 wherein said alert means further comprises an audible alarm initiated by the beginning of said channel active signal.

5. Detection apparatus as defined in claim 4 wherein said audible alarm comprises audible tone pulses during said channel active signal.

6. Detection apparatus as defined in claim 4 wherein said audible alarm comprises a predetermined number of audible tone pulses.

7. Detection apparatus as defined in claim 2 further including an all-clear indicator light which is normally illuminated and which is extinguished during said channel active signal and during said timing delay signal.

8. Detection apparatus as defined in claim 1 wherein said alert means comprises a first operator alert initiated by said channel active signal and a second operator alert which is continuous during said channel active signal and during said timing delay signal.

9. Detection apparatus as defined in claim 1 wherein said radio frequency scanner includes means for monitoring voice transmissions.

10. Detection apparatus as defined in claim 1 wherein said timing delay signal has a predetermined time duration.

11. Apparatus for detecting the presence of a radio transmitter of known frequency and power within a predetermined distance of a moving vehicle, said apparatus comprising:

radio receiver means for receiving a signal from said radio transmitter and providing a received signal;

signal detector means responsive to said received signal for providing a channel active signal during the time that said received signal exceeds a prescribed level;

timing means responsive to said channel active signal for generating a timing delay signal having a duration based on an estimated speed of said vehicle relative to the power of said transmitter; and alert means responsive to said channel active signal and said timing delay signal for generating an operator alert during said channel active signal and during said timing delay signal.

12. Detection apparatus as defined in claim 11 wherein said timing delay signal is initiated by the end of said channel active signal.

13. Detection apparatus as defined in claim 12 wherein said alert means comprises an alarm indicator light illuminated during said channel active signal and during said timing delay signal.

14. Detection apparatus as defined in claim 13 wherein said alert means further comprises an audible alarm initiated by the beginning of said channel active signal.

15. Detection apparatus as defined in claim 14 wherein said audible alarm comprises audible tone pulses during said channel active signal.

16. Detection apparatus as defined in claim 14 wherein said audible alarm comprises a predetermined number of audible tone pulses.

17. Detection apparatus as defined in claim 12 further including an all-clear indicator light which is normally illuminated and which is extinguished during said channel active signal and during said timing delay signal.

18. Detection apparatus as defined in claim 11 wherein said alert means comprises a first operator alert initiated by said channel active signal and a second operator alert which is continuous during said channel active signal and during said timing delay signal.

19. Detection apparatus as defined in claim 11 wherein said radio receiver means includes means for monitoring voice transmissions by said transmitter.

20. Detection apparatus as defined in claim 11 wherein said timing delay signal has a predetermined time duration.

21. Detection apparatus for modification of a radio receiver to detect the presence of a radio transmitter of known frequency and power within a predetermined distance of a moving vehicle, said apparatus comprising:

sensing means responsive to a received signal from said radio receiver for providing a channel active signal when said received signal exceeds a prescribed level;

timing means responsive to said channel active signal for generating a timing signal having a duration based on an estimated speed of said vehicle relative to the power level of said transmitter; and alert means for generating an operator alert during said channel active signal and said timing signal.

22. Detection apparatus as defined in claim 21 wherein said timing signal has a predetermined time duration.

* * * * *